(12) United States Patent
Kisclev et al.

(10) Patent No.: US 7,308,541 B1
(45) Date of Patent: Dec. 11, 2007

(54) OPTIMISTIC READS IN A MULTI-NODE ENVIRONMENT

(75) Inventors: Oleg Kisclev, Palo Alto, CA (US); Ronald S. Karr, Palo Alto, CA (US)

(73) Assignee: Symantec Corporation, Cupertino, CA (US)

( * ) Notice: Subject to any disclaimer, the term of this patent is extended or adjusted under 35 U.S.C. 154(b) by 0 days.

(21) Appl. No.: 11/641,632

(22) Filed: Dec. 19, 2006

Related U.S. Application Data

(63) Continuation of application No. 10/610,193, filed on Jun. 30, 2003, now Pat. No. 7,155,577.

(51) Int. Cl.
*G06F 13/14* (2006.01)
(52) U.S. Cl. ..................................... 711/151
(58) Field of Classification Search ............... 711/112, 711/113, 137, 141, 213, 151
See application file for complete search history.

(56) References Cited

U.S. PATENT DOCUMENTS

| | | | |
|---|---|---|---|
| 6,557,069 B1 | 4/2003 | Drehmel et al. | 710/307 |
| 6,829,665 B2 | 12/2004 | Jones et al. | 710/107 |
| 6,832,297 B2 | 12/2004 | Pfister et al. | 711/144 |

*Primary Examiner*—Kevin L. Ellis
(74) *Attorney, Agent, or Firm*—Campbell Stephenson LLP

(57) ABSTRACT

A method, system, computer system, and computer program produce to support a distributed environment in which changes to data shared by multiple nodes are logged using private logs and managed by a coordinator. The coordinator recognizes invalidating operations and informs a reader when data need to be read again after an invalidating operation corrupted and/or caused the copy of the data read by the reader to be out-of-date. The coordinator can provide a location from which current valid data can be read. The coordinator can use an operations history to detect invalidating operations and operations trackers to determine when a node is not synchronized with the coordinator.

18 Claims, 14 Drawing Sheets

*Coordinator Actions Upon Receiving Read Request*

Environment
(Prior Art)

Coordinated Environment

| Event | Event Initiator | Reader (Node 110A) Memory Contents | Private Log 232A Contents | Private Log 232B Contents | Private Log 232C Contents | Shared Storage Contents | Lock on Shared Storage |
|---|---|---|---|---|---|---|---|
| 3.1 Initiate Write Operation to Block A | Node 110C | | | | | A = 150 | Block A unlocked |
| 3.2.1 Request Permission to Write to Block A | Node 110C | | | | A = 200 | A = 150 | Block A unlocked |
| 3.2.2 Simultaneously Write Data to Private Log | | | | | | | |
| 3.3.1 Grant Permission to Write Data to Node 110C | Coordinator 240 | | | | A = 200 | A = 150 | Block A locked |
| 3.3.2 Issue Lock on Block A to Node 110C | | | | | | | |
| 3.4 Indicate Write Operation Completed | Node 110C | | | | A = 200 | A = 150 | Block A locked |
| 3.5.1 Request to Read Data in Block A | Node 110A | A = 150 | | | A = 200 | A = 150 | Block A locked |
| 3.5.2 Simultaneously Read Data in Block A from Shared Storage | | | | | | | |
| 3.6 Asynchronously Write Data to Block A in Shared Storage | Node 110C | A = 150 | | | A = 200 | A = 200 | Block A locked |
| 3.7 Unlock Block A | Node 110C | A = 150 | | | A = 200 | A = 200 | Block A unlocked |
| 3.8 Clear Private Log | Node 110C | A = 150 | | | | A = 200 | Block A unlocked |
| 3.9 Check whether Block A Locked | Coordinator 240 | A = 150 | | | | A = 200 | Block A unlocked |
| 3.10 Authorize Read Requested in event 3.5.1 from Current Location (Shared Storage) | Coordinator 240 | | | | | A = 200 | Block A unlocked |
| 3.11 Indicate Read Operation Completed because Data from Shared Storage has already been Read | Node 110A | A = 150 | | | | A = 200 | Block A unlocked |

*Fig. 3*
*Timing Problem*

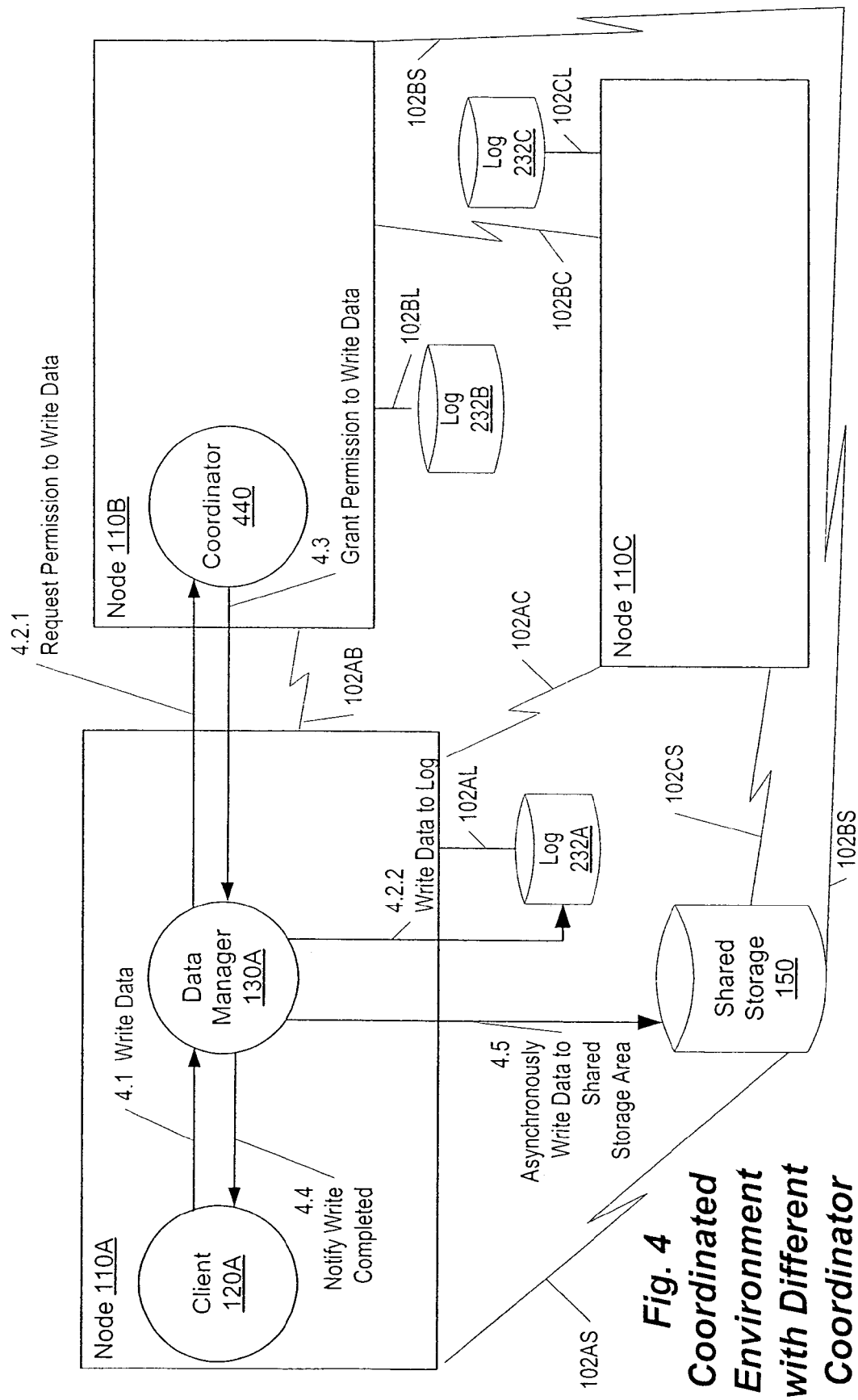
Fig. 4 Coordinated Environment with Different Coordinator

| Event | Event Initiator | Private Log 232A Contents | Private Log 232B Contents | Private Log 232C Contents | Shared Storage Contents | Lock on Shared Storage |
|---|---|---|---|---|---|---|
| 5.1 Initiate Write Operation to Block A | Node 110A | | | | | |
| 5.2.1 Request Permission to Write to Block A | Node 110A | A = 150 | | | | |
| 5.2.2 Simultaneously Write Data to Private Log | | | | | | |
| 5.3.1 Grant Permission to Write Data to Node 110A | Coordinator 440 | A = 150 | | | | Block A locked |
| 5.3.2 Simultaneously Issue Lock on Block A to Node 110A | | | | | | |
| 5.4 Indicate Write Operation Completed | Node 110A | A = 150 | | | | Block A locked |
| 5.5 Asynchronously Write Data to Block A in Shared Storage Volume | Node 110A | A = 150 | | | A = 150 | Block A locked |
| 5.6 Unlock Block A | Node 110A | A = 150 | | | A = 150 | Block A unlocked |
| 5.7 Clear Private Log | Node 110A | | | | A = 150 | Block A unlocked |

*Fig. 5*
*Logging Writes to Shared Data*

Coordinator
Actions Upon
Receiving Write Request

Coordinator
Actions Upon
Receiving
Read Request

Details for
Determining
Location
from Which to
Re-read Data

| Event | Event Initiator | Reader (Node 110A) Memory Contents | Operations Trackers | | | | Private Log Contents | | | Operatn History Contents | Shared Storage Contents | Lock on Block A of Shared Storage |
|---|---|---|---|---|---|---|---|---|---|---|---|---|
| | | | Coord 440 | Node 110A | Node 110B | Node 110C | Log 232A | Log 232B | Log 232C | | | |
| 7.1 Initiate Write Operation to Block A | Node 110C | | Trkr=6 | | | Trkr=6 | | | | 5: A 6: B | A=150 | A unlocked |
| 7.2.1 Request Permission to Write to Block A | Node 110C | | Trkr=6 | | | Trkr=6 | | | A=200 | 5: A 6: B | A=150 | A unlocked |
| 7.2.2 Simultaneously Write Data to Private Log | | | | | | | | | | | | |
| 7.3 Grant Permission to Write Data and Issue Lock to Node 110C | Coord 142 | | Trkr=6 | | | Trkr=6 | | | A=200 | 5: A 6: B | A=150 | A locked |
| 7.4 Indicate Write Operation Completed | Node 110C | | Trkr=6 | | | Trkr=6 | | | A=200 | 5: A 6: B | A=150 | A locked |

*Fig. 7A Operations Tracking*

| Event | Event Initiator | Reader (Node 110A) Memory Contents | Operations Trackers | | | | Private Log Contents | | | Operatn History Contents | Shared Storage Contents | Lock on Block A of Shared Storage |
|---|---|---|---|---|---|---|---|---|---|---|---|---|
| | | | Coord 440 | Node 110A | Node 110B | Node 110C | Log 232A | Log 232B | Log 232C | | | |
| 7.5.1 Request to Read Data in Block A  7.5.2 Simultaneously Read Data in Block A from Shared Storage | Node 110A | A=150 | Trkr=6 | | | Trkr=6 | | | A=200 | 5: A 6: B | A=150 | A locked |
| 7.6 Asynchronously Write Data to Block A in Shared Storage | Node 110C | A=150 | Trkr=6 | | | Trkr=6 | | | A=200 | 5: A 6: B | A=200 | A locked |
| 7.7 Unlock Block A and Update Operations Tracker | Node 110C | A=150 | Trkr=6 | | | Trkr=7 | | | A=200 | 5: A 6: B | A=200 | A unlocked |
| 7.8 Save Write & Update Operations Tracker in History | Coord 440 | A=150 | Trkr=7 | | | Trkr=7 | | | A=200 | 5: A 6: B 7: A | A=200 | A unlocked |
| 7.9 Clear Private Log | Node 110C | A=150 | Trkr=7 | | | Trkr=7 | | | | 5: A 6: B 7: A | A=200 | A unlocked |

*Fig. 7B Operations Tracking (continued)*

| Event | Event Initiator | Reader (Node 110A) Memory Contents | Operations Trackers | | | | Private Log Contents | | | Operatn History Contents | Shared Storage Contents | Lock on Block A of Shared Storage |
|---|---|---|---|---|---|---|---|---|---|---|---|---|
| | | | Coord 440 | Node 110A | Node 110B | Node 110C | Log 232A | Log 232B | Log 232C | | | |
| 7.10 Check whether Block A Locked | Coord 440 | A=150 | Trkr=7 | | | Trkr=7 | | | | 5: A<br>6: B<br>7: A | A=200 | A<br>unlocked |
| 7.11 Check Operations History | Coord 440 | A=150 | Trkr=7 | | | Trkr=7 | | | | 5: A<br>6: B<br>7: A | A=200 | A<br>unlocked |
| 7.12 Notify Reader to Re-read | Coord 440 | A=150 | Trkr=7 | | | Trkr=7 | | | | 5: A<br>6: B<br>7: A | A=200 | A<br>unlocked |
| 7.13 Re-read Data from Shared Storage | Node 110A | A=200 | Trkr=7 | | | Trkr=7 | | | | 5: A<br>6: B<br>7: A | A=200 | A<br>unlocked |
| 7.14 Indicate Read Completed | Node 110A | A=200 | Trkr=7 | | | Trkr=7 | | | | 5: A<br>6: B<br>7: A | A=200 | A<br>unlocked |
| 7.15 Remove Write #5 from Operations History | Coord 440 | A=200 | Trkr=7 | | | Trkr=7 | | | | 6: B<br>7: A | A=200 | A<br>unlocked |

*Fig. 7C Operations Tracking (continued)*

| Event | Event Initiator | Reader (Node 110A) Memory Contents | Operations Trackers ||||  Private Log Contents ||| Operatn History Contents | Shared Storage Contents | Lock on Block A of Shared Storage |
|---|---|---|---|---|---|---|---|---|---|---|---|---|
| | | | Coord 440 | Node 110A | Node 110B | Node 110C | Log 232A | Log 232B | Log 232C | | | |
| 8.1 Initial State | | | Trkr=7 | Trkr=2 | Trkr=7 | Trkr=7 | | | | 6: B<br>7: A | A=200 | A unlocked |
| 8.2.1 Request to Read Data in Block A Providing Value for Operations Tracker | Node 110A | A=200 | Trkr=7 | Trkr=2 | Trkr=7 | Trkr=7 | | | | 6: B<br>7: A | A=200 | A unlocked |
| 8.2.2 Simultaneously Read Data in Block A from Shared Storage | | | | | | | | | | | | |
| 8.3 Check Operations Tracker | Coord 440 | A=200 | Trkr=7 | Trkr=2 | Trkr=7 | Trkr=7 | | | | 6: B<br>7: A | A=200 | A unlocked |
| 8.4 Notify Reader to Re-read and Provide Correct Value of Operations Tracker | Coord 440 | A=200 | Trkr=7 | Trkr=7 | Trkr=7 | Trkr=7 | | | | 6: B<br>7: A | A=200 | A unlocked |

*Fig. 8A  Use of Operations Trackers*

| Event | Event Initiator | Reader (Node 110A) Memory Contents | Operations Trackers | | | | Private Log Contents | | | Operatn History Contents | Shared Storage Contents | Lock on Block A of Shared Storage |
|---|---|---|---|---|---|---|---|---|---|---|---|---|
| | | | Coord 440 | Node 110A | Node 110B | Node 110C | Log 232A | Log 232B | Log 232C | | | |
| 8.5.1 Request to Re-Read Data in Block A Providing Correct Operation Tracker 8.5.2 Simultaneously Read Data in Block A from Shared Storage | Node 110A | A=200 | Trkr=7 | Trkr=7 | Trkr=7 | Trkr=7 | | | | 6: B 7: A | A=200 | A |
| 8.6 Indicate Read Completed | Node 110A | A=200 | Trkr=7 | Trkr=7 | Trkr=7 | Trkr=7 | | | | 6: B 7: A | A=200 | A unlocked |
| 8.7 Send Message to Retain Data Read | Coord 440 | A=200 | Trkr=7 | Trkr=7 | Trkr=7 | Trkr=7 | | | | 6: B 7: A | A=200 | A unlocked |

*Fig. 8B*
*Use of Operations Trackers (continued)*

OPTIMISTIC READS IN A MULTI-NODE ENVIRONMENT

CROSS-REFERENCE TO RELATED APPLICATIONS

This application is a continuation of application Ser. No. 10/610,193, filed on Jun. 30, 2003, now U.S. Pat. No. 7,155,577 entitled "Optimistic Reads in a Multi-node Environment" and naming Oleg Kiselev and Ronald S. Karr as inventors, the parent application being incorporated herein by reference in its entirety.

Portions of this parent application contain materials that are subject to copyright protection. The copyright owner has no objection to the facsimile reproduction by anyone of the patent document, or the patent disclosure, as it appears in the Patent and Trademark Office file or records, but otherwise reserves all copyright rights whatsoever.

BACKGROUND OF THE INVENTION

Most complex computer software applications are run not on a single computer system, but in a distributed system in which multiple computer systems, referred to as nodes, each contribute processing resources and perform different tasks. The computer system in the distributed system can be connected via a network to each other when geographically dispersed or may operate as a cluster of nodes. In either configuration, typically each node is connected to one or more storage devices either directly or via a network connection. A common configuration is for each node to have its own dedicated storage devices as well as shared storage accessible to some or all nodes in the distributed system.

FIG. 1 is a block diagram illustrating a prior art distributed network in which the invention operates. Node 110A, node 110B and node 110C (collectively referred to as nodes 110) are examples of nodes in the distributed system. Hardware components of a computer system that can be used to provide each of nodes 110 are described in further detail with reference to FIG. 9. Shared storage 150 stores data shared by nodes 110A. In one embodiment, shared storage 150 is a data volume onto which shared data are written to and read from by each of nodes 110.

Nodes 110 are connected to each other and to shared storage 150 via a set of communication links making up a network 102. One of skill in the art will recognize that nodes 110 may be part of a cluster of nodes where all storage is shared, in contrast to the example given in FIG. 1 showing an underlying network rather than connections within the cluster. Network 102 is represented in FIG. 1A as having link 102AB connecting nodes 110A and 110B, link 102BC connecting nodes 110B and 110C, and link 102AC connecting nodes 110A and 110C. Network 102 is also shown as including link 102AS from node 110A to shared storage 150, link 102BS from node 110B to shared storage 150, and link 102CS from node 110C to shared storage 150. One of skill in the art will recognize that different physical network configurations can be used to implement these communication links. For example, the node-to-node communication links and node-to-storage links may communicate over physically separate networks, such as a node-to-node link over an Ethernet Transmission Control Protocol/Internet Protocol (TCP/IP) network and the node-to-storage links over a separate fibre channel storage area network (SAN). Different protocols are typically used for communicating storage information than the protocols used to communicate between nodes, although the use of different protocols is not a requirement of the invention.

In an alternative implementation, both the node-to-node links and the node-to-storage links can be implemented over the same physical network if that network can carry both input/output (I/O) storage communication and inter-node communication simultaneously. Examples of such implementations are TCP/IP over an underlying fibre channel storage area network (SAN), a multiplexing of multiple protocols over Infiniband (IB), or a storage protocol such as Internet Small Computer System Interface (iSCSI) layered over TCP/IP on an Ethernet network supporting a high bit rate (i.e., one to ten gigabits per second (Gbps)).

To enable nodes in the distributed system 100 to share data, nodes can be allowed to read from and write to shared storage 150. However, the possibility exists that one node may be writing data to a region of shared storage 150 and/or performing another type of operation, such as a reconfiguration of shared storage 150, that may invalidate data that another node is simultaneously reading. A solution is needed to recognize invalidating operations, such as a write operation overlapping with the read operation, and to inform a reader when the data need to be read again after the invalidating operation corrupted and/or caused the copy of the data read by the reader to be out-of-date. Preferably, the reader is informed of a location from which current valid data can be obtained.

SUMMARY OF THE INVENTION

A method, system, computer system, and computer program product to provide a distributed environment in which changes to data shared by multiple nodes are logged using private logs and managed by a coordinator. The coordinator recognizes invalidating operations, such as write operations overlapping a read operation, and informs a reader when data need to be read again after the invalidating operation corrupted and/or caused the copy of the data read by the reader to be out-of-date. The coordinator can provide a location from which current valid data can be read. The coordinator can use an operations history to record and detect invalidating operations and an operations tracker to determine when a node's value(s) for the operations tracker is not synchronized with the value of the operations tracker at the coordinator.

BRIEF DESCRIPTION OF THE DRAWINGS

The present invention may be better understood, and its numerous objectives, features, and advantages made apparent to those skilled in the art by referencing the accompanying drawings.

FIG. 3 is a table showing events that can occur when logging data in the environment of FIG. 2.

FIG. 4 shows a data flow through one embodiment of a coordinator modified to avoid the timing problem of FIG. 3, where the data flow performs coordinated distributed logging of write operations to shared data.

FIG. 5 is a table showing examples of events that can occur when write operations on data are logged in the environment of FIG. 4.

FIGS. 7A, 7B, and 7C, collectively referred to as FIG. 7, show examples of events that occur when using an operations history to prevent the timing problem shown in FIG. 3.

FIGS. 8A and 8B, collectively referred to as FIG. 8, are a table showing examples of events that occur when using an operations history and operations trackers to detect that a node has received incorrect data.

The use of the same reference symbols in different drawings indicates similar or identical items.

DETAILED DESCRIPTION

Figure 1:
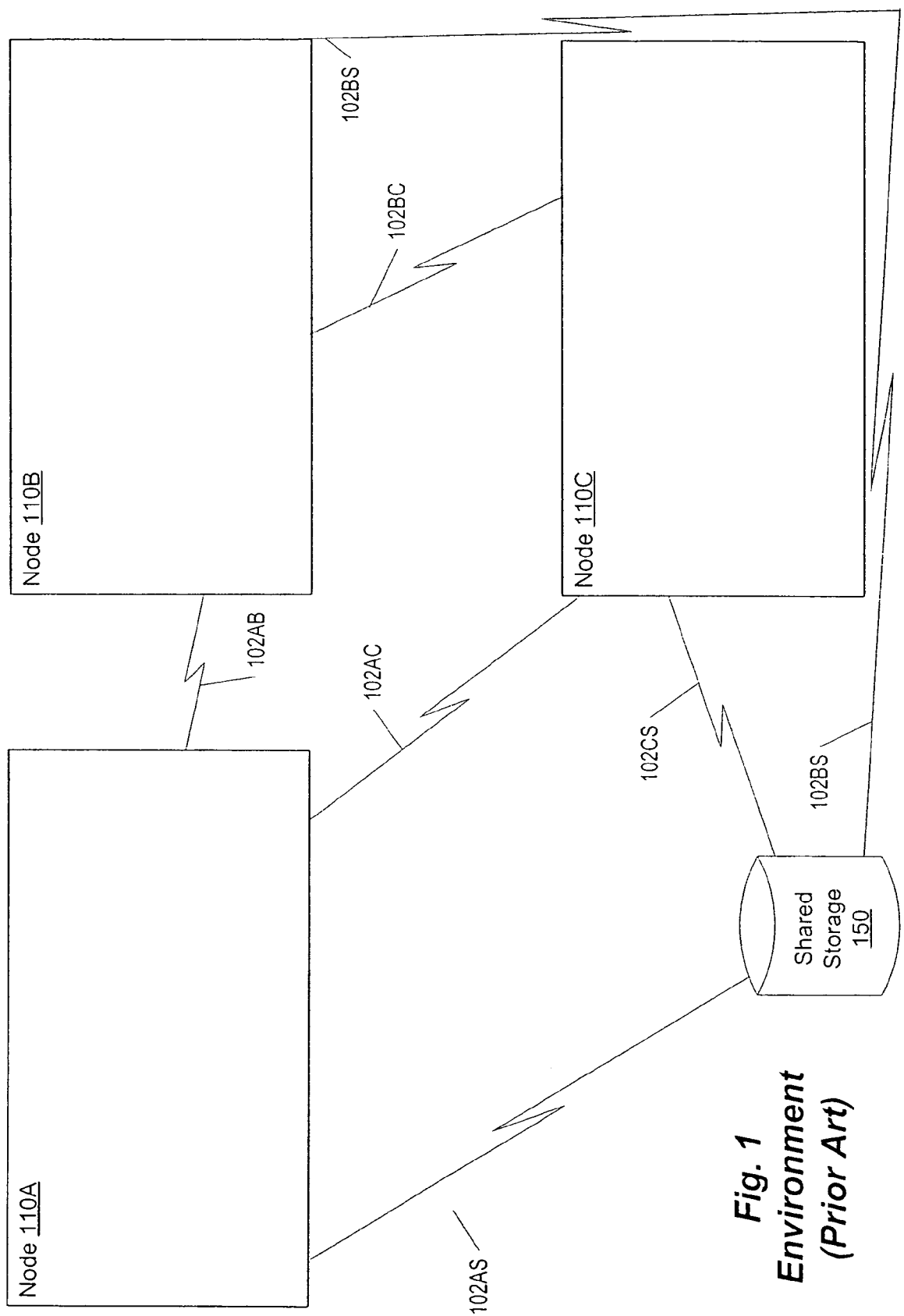
FIG. 1 is a block diagram illustrating a prior art distributed network in which the invention operates, as described above.

For a thorough understanding of the subject invention, refer to the following Detailed Description, including the appended Claims, in connection with the above-described Drawings. Although the present invention is described in connection with several embodiments, the invention is not intended to be limited to the specific forms set forth herein. On the contrary, it is intended to cover such alternatives, modifications, and equivalents as can be reasonably included within the scope of the invention as defined by the appended Claims.

In the following description, for purposes of explanation, numerous specific details are set forth in order to provide a thorough understanding of the invention. It will be apparent, however, to one skilled in the art that the invention can be practiced without these specific details.

References in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

INTRODUCTION

The present invention provides a distributed environment in which changes to data shared by multiple nodes are logged using private logs and managed by a coordinator. The coordinator recognizes invalidating operations and informs a reader when data need to be read again after an invalidating operation corrupted and/or caused the copy of the data read by the reader to be out-of-date. The coordinator can provide a location from which current valid data can be read. The coordinator can use an operations history to record and detect invalidating operations, such as a write operation overlapping the read operation, and operation trackers to determine when a node is not synchronized with the coordinator for the distributed system.

Using private logs or similar "write anywhere" processing in a write operation can greatly improve performance of write operations. Data are considered committed once the data are stored in a private log or other persistent storage, and a copy is maintained in memory for writing to shared persistent storage later. Storing a copy in memory for a node avoids sending a request across a bus to read the data from the log stored on disk. A system using private logs or other persistent storage, however, can produce a situation where a given block or region of data is valid only in one private log, rather than in the shared storage. The description of writing changes to data to a private log is used for discussion purposes herein. One of ordinary skill in the art will recognize that references to logging or logs encompass other types of I/O tracking and caching activities that store changes to data in storage or memory for later application to persistent shared storage. For example, data can be stored in numerous other ways that provide low-latency and high-bandwidth write logging, such as content-addressable, cache-structured, and other organizations of storage built from Micro-Electro-Mechanical systems (MEMS) memory; "solid-state" disks; and other high-bandwidth, low-latency technologies.

Ideal logging conditions tolerate minimal, if any, delays to access data and achieve sequential input/output (I/O) accesses on data logging. The term "non-blocking environment" is used to refer to a distributed system in which reading from a log is allowed. The term "blocking environment" is used to refer to a distributed system in which requests to read data that are valid only in a private log are blocked, forcing the reader to wait to obtain the data from shared storage after the data in the private log are written to the shared storage. In this approach, each read operation is delayed until the coordinator provides a signal that the reader can read from the shared storage. The time required for the read operation therefore is increased by the time required by the messaging protocol for sending messages to and from the coordinator.

Allowing both read and write operations to a given log in a non-blocking environment can disturb the head positions on the logging disks. If a large number of changes to data are being made, the intermingling of reads and writes can result in head thrashing and significant delays in production application I/O accesses to shared data. In organizations where writes to logs cannot be slowed, a blocking environment can be implemented. In blocking environments, each read operation for a given block is blocked by a lock imposed by a coordinator until a write operation being performed on the given block completes and the lock for the block is dropped. This approach, however, penalizes all readers by introducing potentially significant delays in reading data from a shared storage environment. A tradeoff must be considered between delays in reading and writing data.

In a non-blocking environment, read operations on a log intermingle with write operations. In one embodiment, read operations are re-directed to read from the log when an invalidating operation has occurred. For example, a write operation that has been initiated may have been granted a lock to write to storage containing the data. While the lock is still active, the lock operation is considered to be an invalidating operation even though the write operation may not be completed. In this embodiment, logs can be implemented as "circular logs," where a fixed amount of space is allocated for the log and any region of the log may be overwritten by new data if no lock is placed on the region to prevent reuse of the region. In this embodiment, to overcome this problem, the re-directed read operation locks one or more regions in the log to prevent the regions from being reused until the read operation completes.

Figure 2:
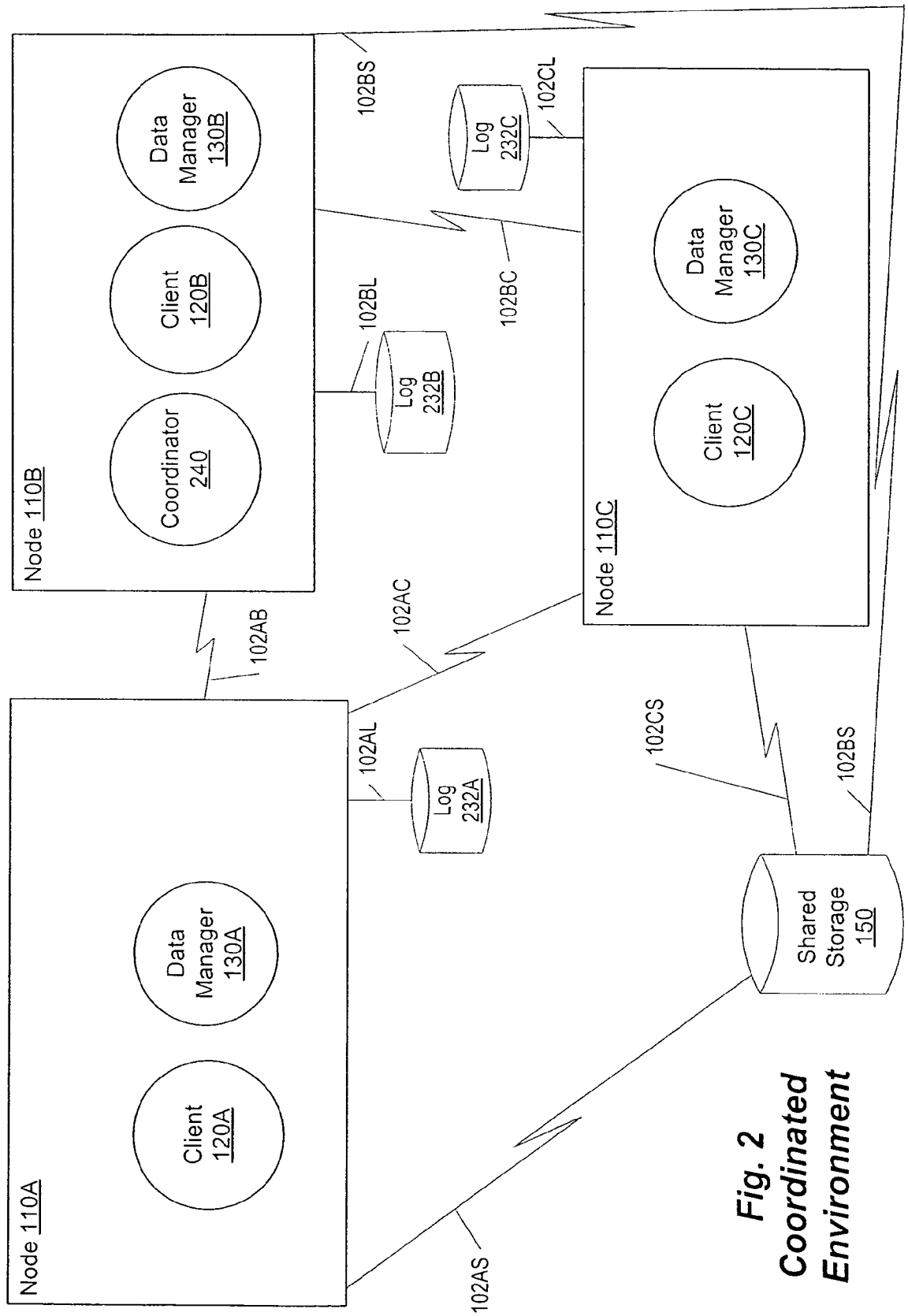
FIG. 2 is a block diagram illustrating a distributed environment in which changes to data shared by multiple nodes are logged using private logs and managed by one implementation of a coordinator.

FIG. 2 is a block diagram illustrating a distributed environment in which changes to data shared by multiple nodes are logged using private logs and managed by a coordinator. Each of nodes 110A, 110B, and 110C communicates with a respective private log, as shown by connection 102AL between node 110A and long 232A, connection 102BL between node 110B and log 232B, and connection 102CL between node 110C and log 232C. The respective private logs can be considered to be storage devices connected as part of network 102, although more than one physical network may underlie the implementation, as described above with reference to FIG. 1. One of skill in the are will understand that the present invention is not limited to any particular network configuration and that the configuration shown in FIG. 2 is but one example of an implementation of the invention. Nodes 110A, 110B, and 110C have exclusive write access to respective private logs 232A, 232B, and 232C. Each of logs 232A, 232B, and 232C can be considered to include multiple units of storage, interchangeably referred to herein as blocks or regions containing multiple blocks, upon which respective nodes 110A, 110B, and 110C can perform read operations (in a non-blocking environment) and write operations.

Node 110A includes application process client 120A that processes data shared by nodes 110, where the shared data are stored in shared storage 150. Nodes 110B and 110C are shown as having their own respective clients 120B and 120C, and collectively clients 120A, 120B and 120C are referred to as clients 120. Node 110A application process data manager 130A provides an interface to shared storage 150 and handles the physical writes to the underlying storage device (i.e., the devices underlying a logical storage volume represented by shared storage 150). Nodes 110B and 110C are also shown as having their own respective data managers 130B and 130C. It is not a requirement that every node in distributed system recognize that other types of processes may interact or a single process may include functionality to perform writes to shared storage.

Node 110B also includes a coordinator 240, which coordinates the logging activity performed on nodes 110 and ensures that data are written to shared storage 150. It is not a requirement that coordinator 240 run on one of nodes 110, and coordinator 240 may be provided as a process and/or device accessible by nodes 110 via network 102. Coordinator 240 can use locks to prevent invalidating operations, such as conflicting write operations, to a given block. The discussion herein describes the use of locks, although other methods of preventing invalidating operations are within the scope of the invention.

For further information regarding the environment described in FIG. 2, see co-pending U.S. patent application Ser. No. 10/610,393, filed on Jun. 30, 2003, entitled "Coordinated Distributed Logging in a Multi-Host Environment" and naming as inventors Ronald S. Karr, Oleg Kiselev, and John A. Colgrove. This co-pending application is hereby incorporated herein by reference in its entirety and for all purposes.

FIG. 3 is a table showing events that can occur when logging data in the environment of FIG. 2, where the events lead to a node receiving incorrect data due to a timing problem. At the time the events in FIG. 3 begin, no data exist in reader memory or in any of private logs 232A, 232B, and 232C, and block A of shared storage 150 contains a value of 150. No lock is held on block A.

In event 3.1, node 110C initiates a write operation to block A of shared storage 150. Events 3.2.1 and 3.2.2 are performed simultaneously, and no ordering is implied by the numbering; i.e., event 3.2.2 can precede event 3.2.1 or vice versa. This convention is followed in all of the figures described below whenever two events are said to occur simultaneously. In event 3.2.1, node 110C requests permission to write data (enforced by locking) from coordinator 240 on node 110B. In event 3.2.2, node 110C simultaneously writes data (A=200) to log 232C, as shown in the "Private Log 232C Contents" column of the table. In event 3.3.1, coordinator 240 grants permission to write the data and simultaneously, in event 3.3.2, issues a lock on block A to node 110C, as indicated by the "Lock on Shared Storage" column of the table. In event 3.4, a process running on node 110C, such as data manager 130C of FIG. 2, returns from the write request, indicating that the write is complete to the requesting writer, here client 120C.

In event 3.5.1, node 110A requests to read data in block A and simultaneously, in event 3.5.2, reads data in block A from shared storage 150, as shown in the "Reader (Node 110A) Memory Contents" column of the table. Note that the current state is that private log 232C contains a value of 200 for block A, whereas each of shared storage 150 and node 110A's memory contents contains a value of 150 because the asynchronous write to shared storage 150 has not yet occurred.

In event 3.6, node 110C asynchronously writes data in block A to the shared storage 150. As a result, the "Shared Storage Contents" column of the table now indicates that block A has a value of 200. In event 3.7, node 110C unlocks block A and, in event 3.8, node 110C clears private log 232C since the data have been written to shared storage 150.

In event 3.9, coordinator 240 determines whether to grant permission for the read requested in event 3.5.1 by checking whether block A is locked. As shown in the "Lock on Shared Storage" column of the table, block A is unlocked. As a result, coordinator 240 determines that the write operation is complete because block A has been unlocked and, in event 3.10, authorizes the read request from the default location (shared storage 150). In event 3.11, node 110A indicates that the read operation is complete because data have already been read from shared storage 150. However, this result is incorrect because, as shown in the "Reader (Node 110A) Memory Contents" and "Shared Storage Contents" columns of the table, the data read are not the current data from shared storage 150. Node 110A therefore receives inaccurate data that the value of block A is 150, when in fact the value of block A is now 200.

FIG. 4 shows a data flow through a coordinator that avoids the timing problem of FIG. 3, where the data flow is the result of coordinated distributed logging of write operations to shared data. Other types of potentially invalidating operations may also be logged, although the discussion herein describes logging of write operations only. In event 4.1, node 110A requests to write data to shared storage 150. In event 4.2.1, node 110A requests permission from coordinator 440 on node 110B to write data to shared storage 150. In event 4.2.2, node 110A simultaneously writes the data to log 232A.

In event 4.3, coordinator 440 grants permission to node 110A to write data to shared storage 150. In determining whether to grant permission, coordinator 440 may check whether a block corresponding to the data being written in locked by another writer and/or for other application-specific criteria to prevent multiple writers from writing to the same block of storage at the same time. In event 4.4, a process running on node 110A (here data manager 130A) returns from the write operation, indicating that the write operation is completed to client 120A. In fact, although the data have been written to private log 232A (persistent storage such as a disk), the data must still be copied to shared storage 150. By receiving notification that the write operation is complete as soon as permission is granted, node 110A can proceed with other activities that assume that the data are updated in shared storage 150.

In event 4.5, data manager 130A asynchronously writes the data to shared storage 150, thereby completely the write operation. The delay between actions 4.4 and 4.5 is configured to be sufficiently small to ensure that by the time these other activities are begun, the actual data have been written to shared storage 150.

Each of FIGS. 5 through 8B described below references the environment described in FIG. 4 and elements of that environment. Therefore, each of FIGS. 5 through 8B should be read in conjunction with viewing FIG. 4.

FIG. 5 is a table showing events that occur when write operations on data are logged in the environment of FIG. 4. At the time the events in FIG. 5 begin, no data exist in any of private logs 232A, 232B, and 232C, and block A of shared storage volume 150 is empty. No lock is held on block A. In event 5.1, node 110A initiates a write operation data to block A of shared storage 150. In event 5.2.1, node 110A requests permission from coordinator 440 on node 110B to write data to shared storage 150. In event 5.2.2, node 110A simultaneously writes the data to log 232A, as shown in the "Private Log 232A Contents" column of the table.

In event 5.3.1, coordinator 440 grants permission to node 110A to write data to shared storage 150. In determining whether to grant permission, coordinator 440 may check whether a block corresponding to the data being written is locked by another writer and/or for other application-specific criteria to prevent multiple writers from writing to the same block of storage at the same time. Simultaneously with event 5.3.1, in event 5.3.2, coordinator 440 issues a lock on block A to node 110A. In event 5.4, a process running on node 110A, such as data manager 130A of FIG. 2, returns from the write operation, indicating that the write operation is completed to the requesting writer, here client 120A. In fact, although the data have been written to private log 232A (persistent storage such as a disk), the data must still be copied to shared storage 150. By receiving notification that the write operation is complete as soon as permission is granted, node 110A can proceed with other activities that assume that the data are updated in shared storage 150.

In event 5.5, node 110A asynchronously writes the data to shared storage 150, thereby completing the write operation. The delay between events 5.4 and 5.5 is configured to be sufficiently small to ensure that by the time these other activities are begun, the actual data have been written to shared storage 150. In event 5.6, node 110A unlocks block A and, in event 5.7, node 110A clears private log 232A, as shown in the "Private Log 232A Contents" column of the table.

Figure 6A:
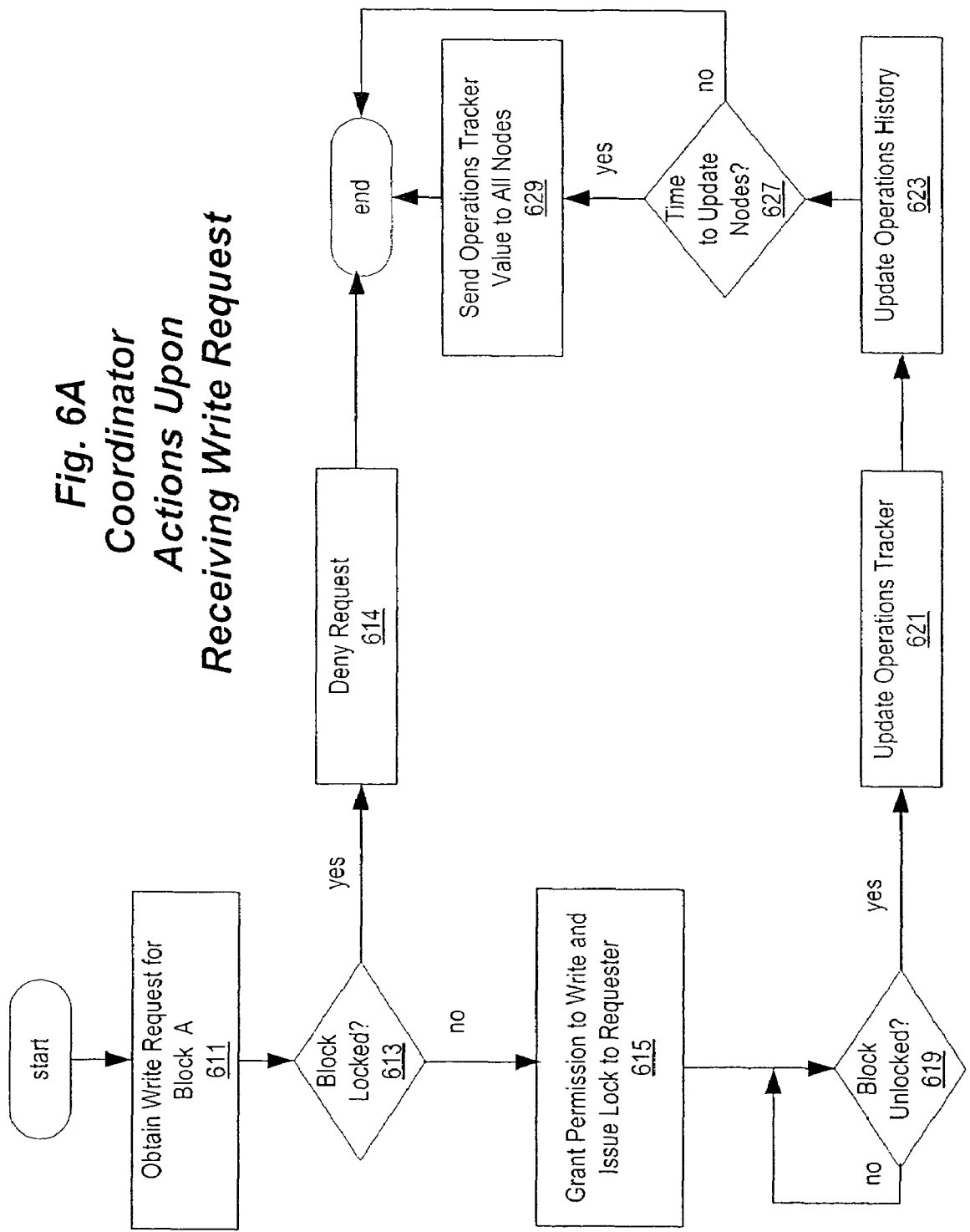
FIG. 6A is a flowchart showing examples of actions of the coordinator of FIG. 4 upon receiving a write request.

FIG. 6A is a flowchart showing actions of coordinator 440 of FIG. 4 upon receiving a write request. In "Obtain Write Request for Block A" step 611, coordinator 440 obtains a request for permission to write to block A of shared storage 150. The request can be received from a requesting reader, such as client 120A of FIG. 2, or through an intermediary, such as data manager 130A of FIG. 2. Coordinator 440 checks whether block A is locked at "Block Locked?" decision point 613. If block A is locked, control proceeds to "Deny Request" step 614, where coordinator denies the request and processing the write request is then complete. In an alternative embodiment, coordinator 440 does not deny the request, but instead blocks (or loops, depending upon the implementation) at "Block Locked" decision point 613 until the lock for the block is unlocked. In this embodiment, coordinator 440 may place the lock request in a queue for processing as soon as block A is unlocked. If block A is unlocked at "Block Locked?" decision point 613, control proceeds to "Grant Permission to Write and Issue Lock to Requester" step 615, where coordinator 440 grants permission to write and issues a lock for block A to the requester.

At "Block Unlocked" decision point 619, coordinator 440 determines whether the lock on block A has been unlocked since the lock was issued. If the lock on block A is locked, coordinator 440 waits until the writer completes the write to block A and for any lock request in a lock request queue to also complete. When the lock on block A is unlocked, control proceeds to "Update Operations Tracker" step 621, where the operations tracker maintained by the coordinator is updated.

Control proceeds from "Update Operations Tracker" step 621 to "Update Operations History" step 623, where the operations history is updated with the current value of the operations tracker and an indicator of the block or region that has been written, here block A. From to "Update Operations History" step 623, control proceeds to "Time to Update Nodes" decision point 627.

While coordinator 440 is typically called with a read or write request from one of the distributed nodes, coordinator 440 may be implemented to periodically initiate communication to update the value of the operations tracker on all nodes 110. For example, if the operations history is maintained for five minutes, coordinator 440 may update the value of the operations trackers on all nodes 110 every two to three minutes. In "Time to Update Nodes" decision point 627, a determination is made whether the time period has elapsed for sending an updated operations tracker to all nodes. If so, control proceeds to "Send Operations Tracker Value to All Nodes" step 629, and processing the write request is complete. Sending a message to each node can be performed asynchronously, imposing little overhead while improving the time required to perform read operations for nodes that read only occasionally. At "Time to Update Nodes" decision point 627, if it is not time to update all nodes or the asynchronous update operation is not in effect, processing the write request is then complete.

The operations tracker of the present invention can be implemented in several ways, and the invention described herein is not limited to any particular implementation. For example, the operations tracker may include a counter of operations that invalidate data, such as write operations, storage configuration operations, cluster configuration operations, and/or cluster partitioning operations. Every invalidating operation performed triggers a re-read of the data. Alternatively, the operations tracker may be implemented as a timestamp that is stored for each operation in the operations history. For operations written to the operations history, the time at which the operation completed is provided. Whenever the coordinator communicates with one of the nodes, the coordinator can provide the current time.

Figure 6B:
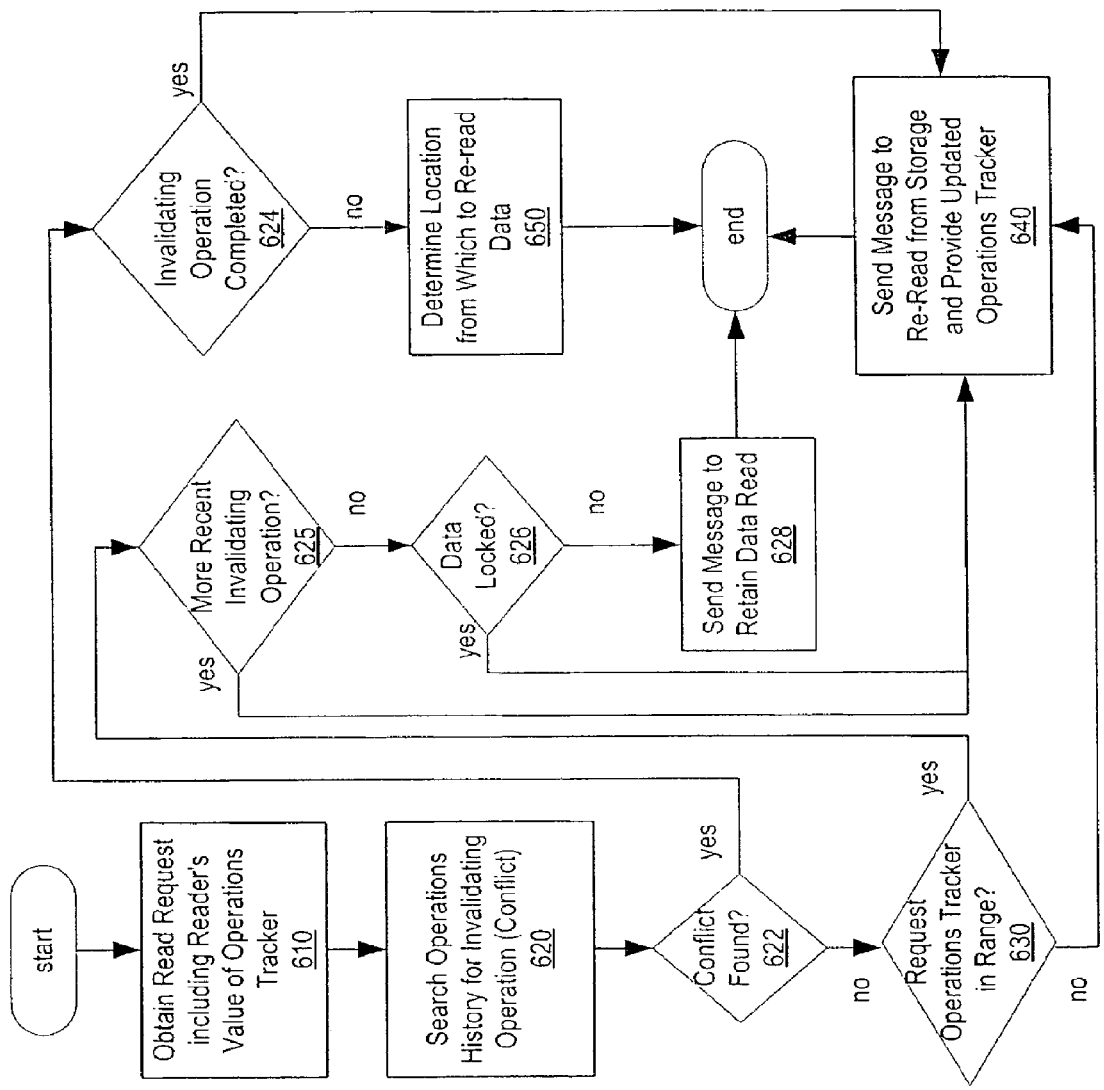
FIG. 6B is a flowchart showing examples of actions of the coordinator of FIG. 4 upon receiving a read request.

FIG. 6B is a flowchart showing actions of coordinator 440 upon receiving a read request. In the embodiment described here and in FIGS. 7 and 8, readers begin an "optimistic" read of the shared storage 150 before receiving permission from coordinator 440 to proceed with the read. Coordinator 440 tells the reader whether to re-read if coordinator 440 determines that an invalidating operation has occurred. Determining whether a potentially invalidating operation has occurred is described further below.

In "Obtain Read Request including Reader's Value of Operations Tracker" step 610, coordinator 440 obtains a read request. The read request, also referred to as a lock request, may include the requesting reader's current value for the operations tracker. Typically, the operations tracker value is obtained by the requesting reader from the coordinator. The requesting reader's current value for the operations tracker provides an indication of the time at which the requesting reader last communicated with the coordinator. Each node is assumed to begin operation with an operations tracker having an invalid value, such as zero, and to update the operations tracker when the node becomes aware (typically by communicating with the coordinator) of an invalidating operation to shared storage. If the requesting reader's current value for the operations tracker is not synchronized with the value of the operations tracker maintained by the coordinator, the requesting reader's request may have been delayed due to network traffic problems, the requesting reader node may have failed, or the requesting reader may be reading data for the first time. The data simultaneously read is considered to be invalid (i.e., out-of-date or corrupted).

From "Obtain Read Request including Operations Tracker" step 610, control proceeds to "Search Operations History for Invalidating Operation (Conflict)" step 620. In one embodiment, coordinator 440 searches the operations history to determine whether any of the blocks requested to be read are present. If any of the blocks requested to be read are in the operations history, the operation affecting that block may have invalidated part or all of the data during or after the reader read the data. Such a sequence of events would cause the reader's data to be out-of-date and/or corrupted and therefore qualifies as an invalidating operation. Other ways to determine whether an invalidating operation has occurred are within the scope of the invention.

At "Conflict Found" decision point 622, coordinator 440 determines the next operation depending upon the search results from "Search Operations History for Invalidating Operation (Conflict)" step 620. If a conflict is found (i.e., an invalidating operation appears in the operations history), control proceeds to "Invalidating Operation Completed?" decision point 624. If a conflict is not found, control proceeds to "Request Operations Tracker in Range?" decision point 630.

At "Request Operations Tracker in Range?" decision point 630, a determination is made whether the operations tracker value provided by the requester is within the range of high and low values of operations trackers present in the operations history. This determination is made because, even though the search of the operations history may not have indicated an invalidating operation, the request to read the data may have been significantly delayed by network traffic, the node requesting to read may have been idle for a long period of time, or the node may be reading from shared storage for the first time.

Determining whether the operations tracker is within range depends upon the underlying implementation of the operations tracker. The operations trackers described in FIGS. 7 and 8 below are counters of a number of invalidating operations.

As an alternative to counters, an operations tracker can be implemented as a timestamp indicating the time that the respective invalidating operation was completed. The timestamp can be recorded in the operations history along with other data for the invalidating operation. For example, if the operations tracker is recorded as a timestamp, and the coordinator's value of the operations tracker indicates completion of the invalidating operation at an earlier time than the requesting reader's value of the timestamp, the invalidating operation was completed before the request to read was sent. The read operation therefore produced valid data because the coordinator does not communicate completion of an invalidating operation to any reader prior to writing the timestamp to the operations history.

In an implementation using timestamps, the clocks need not be synchronized between the node hosting the coordinator and the other distributed nodes requesting to read data. The timestamp is processed only by the coordinator, and the other nodes are not required to read the value of the timestamp. A requesting reader provides the value of the timestamp received from the coordinator, and the coordinator compares the value of that timestamp with other timestamps also generated by the coordinator. Nodes are initialized with an invalid value for the timestamp and receive the current timestamp according to the clock on the node hosting the coordination when first communicating with the coordinator.

One rare result of using a timestamp is that the clocks in some environments, such high-resolution clocks in UNIX environments, track data in very small units, such as nanoseconds. Because some memories do not store data in such precise units, it is theoretically possible to have more than one entry in the operations history with the same timestamp. Such a situation can be avoided by ensuring that the operations history is not updated until the time indicated by the high-resolution clock has a higher value than the most recent entry in the operations history.

Referring back to FIG. 6B, if at "Request Operations Tracker in Range?" decision point 630, the operations tracker is within the range, it is still possible that an invalidating operation has occurred. Control proceeds to "More Recent Invalidating Operation" decision point 625, where a determination is made whether an invalidating operation in the operations history completed after the read request. If so, the invalidating operation has affected the data read, and control proceeds to "Send Message to Re-Read from Storage and Provide Updated Operations Tracker" step 640. Coordinator 440 sends the message and the updated operations tracker to the reader, and processing the read request is then complete.

From "More Recent Invalidating Operation" decision point 625, if no more recent invalidating operation was found, control proceeds to "Data Locked?" decision point 626. If the data are not locked, no need to re-read the data exists, and control proceeds to "Send Message to Retain Data Read" step 628, where coordinator 440 sends a message to the reader indicating that the data read are valid and should be retained. Processing the read request is then complete.

If at "Data Locked" decision point 626, the data are locked, a write operation may be ongoing and the data should be re-read. Control proceeds to "Send Message to Re-Read form Storage and Provide Updated Operations Tracker" step 640, where coordinator 440 sends a message to the reader indicating that the data read should be re-read from shared storage and providing an updated value for the operations tracker. Processing the read request is then complete.

If at "Request Operations Tracker in Range?" decision point 630, the operations tracker is not within the range, the read request has been delayed or the requesting node has otherwise become unsynchronized. Control proceeds to "Send Message to Re-Read from Storage and Provide Updated Operations Tracker" step 640. Coordinator 440 sends the message and the updated operations tracker to the reader, and processing the read request is then complete.

Using the updated value of the operations tracker, the reader's next read request should be within range. Sending the message to direct the reader to read the storage again imposes a small penalty on infrequent read operations, as well as in the very rare situation where the operations tracker has reached a maximum value and must begin again at zero. However, this additional overhead is expected to be much smaller than the overhead required for waiting to complete the read operation when optimistic reads are not used.

At "Invalidating Operation Completed?" decision point 624, an invalidating operation was found in the operations history, and coordinator 440 determines whether the invalidating operation has been completed. If the invalidating operation has been completed, the requester may have been informed that the invalidating operation is complete, but the order of the read and invalidating operations may be unknown (i.e., when using a counter type of operations tracker) and the data should be read again. Control proceeds to "Send Message to Re-Read from Storage and Provide Updated Operations Tracker" step 640. Coordinator 440 sends the message and the updated operations tracker to the reader, and processing the read request is then complete. Using the updated value of the operations tracker, the reader's next read request should be within range.

At "Invalidating Operation Completed?" decision point 624, if coordinator 440 determines that the invalidating operation has not been completed, control proceeds to "Determine Location from Which to Re-read Data" step 650. Details of "Determine Location from Which to Re-read Data" step 650 are provided in FIG. 6C.

Figure 6C:
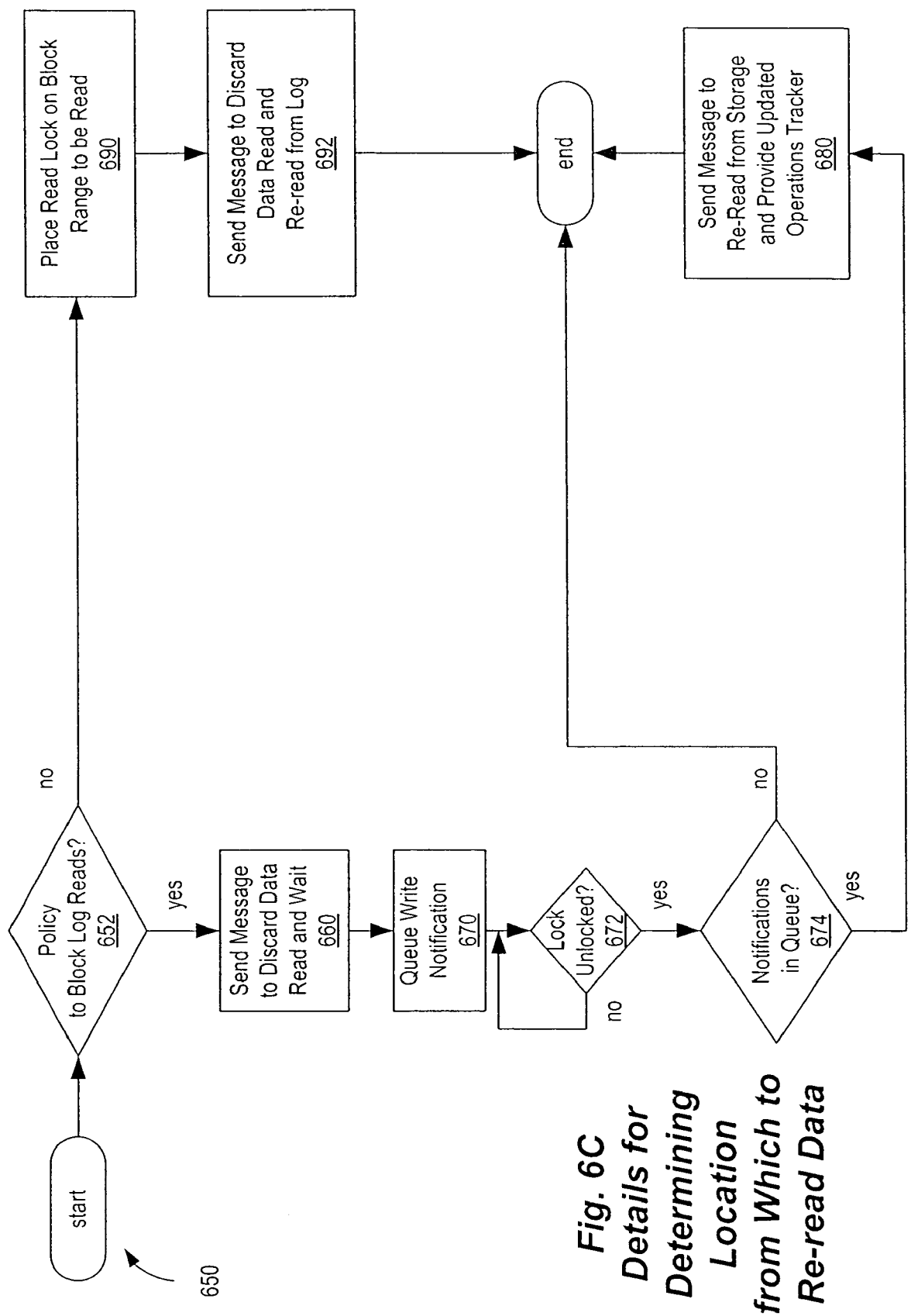
FIG. 6C is a flowchart showing examples of actions of the coordinator of FIG. 4 in performing the "Determine Location from Which to Re-read Data" step of FIG. 6B.

FIG. 6C is a flowchart showing the actions of coordinator 440 in performing "Determine Location from Which to Re-read Data" step 650 of FIG. 6B. At "Policy to Block Log Reads" decision point 652, a determination is made whether reading from logs is allowed in the current environment. If reading from logs is allowed (i.e., not blocked), control proceeds to "Place Read Lock on Block Range to be Read" step 690, where the range of blocks or regions to be read from the log are locked. Control then proceeds to "Send Message to Discard Data Read and Re-read from Log" step 692. Upon sending the message to re-read the data from the log, coordinator 440 has completed the determination of a location from which the data are to be re-read, and processing the read operation is complete.

At "Policy to Block Log Reads" decision point 652, if reading from logs is not allowed (i.e., requests to read from the log are blocked), control proceeds to "Send Message to Discard Data Read and Wait" step 660. Coordinator 440 sends the message to the requesting reader and tells the reader that a notification will be sent when the reader can read the data again because data are valid only in the log, which the reader cannot read. Coordinator 440 then places a write notification into a queue that is read after each lock is unlocked, as shown in "Queue Write Notification" step 670. Control proceeds to "Lock Unlocked?" decision point 672, which indicates that coordinator 440 is in a "wait mode" for any of the locks on the data in shared storage 150 to be unlocked by any node. When a lock is unlocked, control proceeds to "Notifications in Queue" decision point 674.

At "Notifications in Queue" decision point 674, a determination is made whether the queue is empty. This determination is made because of the possibility in the described embodiment that coordinator 440 has already sent all notifications in the queue in response to unlocking another lock. If the queue is empty, processing the read request is completed. If the queue is not empty, control proceeds to "Send Message to Re-Read from Storage and Provide Updated Operations Tracker" step 680 of FIG. 6C. The same module may be used to implement both "Send Message to Read from Storage and Provide Updated Operations Tracker" step 640 of FIG. 6B and "Send Message to Re-Read from Storage and Provide Updated Operations Tracker" step 680 of FIG. 6C. Using the updated value of the operations tracker, the reader's next read request should be within range. Processing the read request is then complete.

Establishing a policy to block or, alternatively, to allow reads from a log requires consideration of several factors. In blocking environments, each read operation for a given block of the log is blocked until a write operation being performed on the given block of the log completes and the lock for the block is unlocked. This approach provides the advantage of avoiding unnecessary allocations of large portions of memory and the associated bus and disk loading. Blocking reads from a log, however, penalizes all readers by introducing potentially significant delays in reading data from shared storage.

In contrast, if read operations are allowed from a log, other variables must be considered. Each read from the log requires movement of the disk heads on the logging disks, and therefore imposes a disruption in write operations. The frequency of read and write operations on the log must be considered. In addition, a decision must be made with respect to a location in which the results of an optimistic read are to be stored. Recall that an optimistic read sends a read request to the default, "normal" location of the data (i.e., shared storage) in parallel with the request to the coordinator for permission to read from the shared storage. If permission is denied, coordinator 440 provides information about the actual current location of the most up-to-date data. If the location query confirms that the default location is correct, then the read operation is allowed to complete. If the location query points to an alternative location of data in one of the node's private logs, a second "corrective" read request is issued to this alternate location, which may be performed in parallel with the ongoing "incorrect" request. The results of the "incorrect" read are discarded, and the results of the corrective read request are returned to the requester. If the operating system supports pre-emption of I/O operation, the "incorrect" read operation can be aborted and the correct read operation can be allowed to continue.

Because the optimistic and corrective read operations are performed in parallel, each read request needs respective memory in which to store data obtained during the read operation. In one embodiment, a device driver for shared storage 150 receiving the read request has a buffer for each requesting reader in which to store the data read for that reader's request. One of the parallel read operations can use that buffer, and memory can be allocated for the other read operation. In this approach, the data for the optimistic read operation can read into either the allocated memory or into the requesting reader's buffer. This approach enables the corrective read operation from the correct location to complete independently of the optimistic read operation.

Performing the optimistic read into private memory places a penalty on read operations that do not encounter an invalidating operation, because the data are copied from the allocated private memory to the requesting reader's buffer. Examples of events that can occur when performing an optimistic read operation into private memory are given below.

A read request is received by coordinator 440, along with the address of the target buffer (B0) for the requesting node. The read request includes an indication of the regions of data to be read from shared storage 150.

Private memory is allocated for the optimistic read operation. The optimistic read operation from the "standard" location in the data volume is initiated and the data read are directed into this private memory (B1). A message is sent by the requesting node to coordinator 440 to check if there is a write lock for this region of the shared storage (volume).

If the lock exists, a corrective read operation on the region indicated by the lock is performed into the requesting reader's buffer B0 described above.

When the read operation into private memory B1 completes and no lock on the region exists, data are copied from B1 to B0 and returned to the requesting node. The read operation is now complete.

If there was a lock on the region being read, some or all of the contents of requesting node's buffer B1 should be discarded. If the read region overlaps, but doesn't completely match the locked region, the results of the read operations into B0 and B1 complement each other and can be combined to produce the results of the read operation. Valid data read are copied to the requesting reader's buffer B0, and the private memory used by B1 is released.

If the lock existed and the corrective read operation into the requesting reader's buffer B0 was initiated, the corrective read operation now completes.

When reading data from both B0 and B1 is completed, the read operation is complete.

One advantage of performing optimistic reads is that the read operation of the shared storage is initiated immediately, without waiting for the response from the coordinator. Therefore, read operations are not delayed by sending a request for permission and waiting for a response. If the valid data are not in the shared storage but are instead in one node's private log, the corrective read operation from the log is performed in parallel with the optimistic read operation (i.e., before the optimistic read operation completes). If the initial data read operation from shared storage produced current data, the data are copied to the requesting reader-supplied buffer.

In some environments, overlapping read and write operations are assumed to be infrequent because they should be prevented by the application issuing the read and write operations. Therefore, the time and resources required for copying the data between the requesting reader-supplied buffer and the private memory are incurred even though the initial read operation is expected to produce valid data. Furthermore, additional processing is incurred due to the overhead of allocating the private memory into which the optimistic read is performed.

In other environments, overlapping read and write operations are allowed and the application assumes responsibility for correcting invalid data produced by the overlapping read and write operations. For example, in an Oracle database environment, Oracle compares checksums on data to determine whether invalid data have been produced, and issues a re-read operation when the data are invalid.

Another approach to allow data to be read from a log is to send results of the optimistic read operation directly into the requesting reader's buffer. This approach can be used when very few concurrent or nearly concurrent writes and reads are expected. If an invalidating operation and a read operation occur and the data obtained in the optimistic read operation is incorrect, the correct results are stored in allocated memory and then copied to the requesting reader's buffer after both the optimistic "incorrect" read and the corrective read are both completed. This approach penalizes overlapping read and write operations by having the correct read operation wait for the read operation from the incorrect location to complete and by requiring the data to be copied to the caller's buffer. This approach, however, imposes no penalties for the expected situation where the read operation does not encounter an invalidating write operation. If the operating system supports I/O pre-emption, the incorrect read operation into private memory can be aborted and the corrective read operation can be directed to read the data into the requesting reader's buffer.

Examples of events that can occur when an optimistic read operation is performed into the requesting reader's buffer are given below.

A read request is received by the coordinator, along with the address of the target buffer (B0). The request indicates the regions of the volume to be read.

A read operation of the "standard" location in the data volume (i.e., shared storage) is initiated by the requesting reader and the data read are directed into the caller's buffer B0.

The requesting reader sends a message to the coordinator to check whether a write lock for the requested region(s) of the volume exists.

If the lock exists, then private memory (B1) is allocated and a read operation is initiated for the region(s) indicated by the lock into the memory B1. If the read region overlaps, but doesn't completely match the locked region, the read into B0 and B1 complement each other and can be combined to provide the correct read results.

The optimistic read operation into target buffer B0 completes.

If no lock on the requested region(s) existed, the read operation is complete.

If a lock existed for the requested region(s), some or all of the contents of B0 are invalid.

If the lock existed and the read into private memory B1 was initiated, that corrective read operation completes. Since some or all of the data in the requested reader's buffer B0 is invalid, the correct data are not copied from private memory B1 to the requesting reader's buffer B0. The space used by B1 is released.

When both read operations of the requesting reader's buffer B0 and private memory B1 are completed and the data read are combined, if necessary, the read operation is complete.

One approach is to implement optimistic reading from a log rather than from shared storage, while switching between locations into which to read the data depending upon the current state of the distributed system. For example, the location into which to optimistically read data can be determined by observing practical latencies of messaging and I/O in the implementation environment and/or upon the frequency with which overlapping read and write operations occur.

The actions of a coordinator described in FIGS. 6A, 6B and 6C are further illustrated for one embodiment of coordinator 440 in FIG. 7, including FIGS. 7A, 7B, and 7C. FIG. 7 shows examples of events that can occur when using an operations history to prevent the timing problem shown in FIG. 3. The operations history can include, for example, a history of write operations performed within a given time period and/or a specific number of write operations to shared storage. Environments that block read operations until a location is provided and environments in which read operations are performed optimistically can incur the timing problem shown in FIG. 3.

The initial state when the events of FIG. 7 begin is that coordinator 440 and node 110C are synchronized with respect to an operations tracker (implemented as a counter of invalidating operations), both having a value of 6. The operations history indicates that a write operation, having a operations tracker value of 5, updated block A, and another write operation, having a operation tracker value of 6, updated block B. The shared storage 150 contains a value for block A of 150, as shown in the "Shared Storage Contents" column of the table. The lock on block A is not locked, as shown in the "Lock on Block A of Shared Storage" column of the table.

In event 7.1, node 110C initiates a write operation to block A of shared storage 150. Events 7.2.1 and 7.2.2 are performed simultaneously and no ordering is implied by the numbering. In event 7.2.1, node 110C requests permission to write data to block A (enforced by locking) from coordinator 440 on node 110B. In event 7.2.2, node 110C simultaneously writes data (A=200) to log 232C, as shown in the "Private Log 232C Contents" column of the table.

In event 7.3, coordinator 240 grants permission to write the data and simultaneously issues a lock on block A to node 110C, as indicated by the "Lock on Block A of Shared Storage" column of the table. In event 7.4, a process running on node 110C (such as data manager 130C of FIG. 2) returns from the write request, indicating that the write is complete.

Referring to FIG. 7B, in event 7.5.1, node 110A requests to read data in block A. Simultaneously, in event 7.5.2, node 110A reads data in block A, having a value of 200, from shared storage 150, as shown in the "Reader (Node 110A) Memory Contents" column of the table. In the embodiment shown, a non-blocking policy provides that locks on a region of shared storage 150 do not prevent a reader from reading data from that region, and thus, node 110A can read the data even though the lock on block A is locked. Note that the current state is that private log 232C contains a value of 200 for block A, whereas each of shared storage 150 and node 110A's memory contents contains a value of 150 because the asynchronous write to shared storage 150 has not yet occurred.

In event 7.6, node 110C asynchronously writes data in block A to the shared storage 150. As a result, the "Shared Storage Contents" column of the table now indicates that block A has a value of 200. In event 7.7, node 110C unlocks the lock on block A, as shown in the "Lock on Block A of Shared Storage" column of the table. Node 110C also updates the respective operations tracker (here implemented as a counter), as shown in the "Node 110C" portion of the "Operations Trackers" column of the table. In event 7.8, coordinator 440 saves information about the asynchronous write operation of event 7.6 in the operations history, including the operations tracker value and the block affected by the write operation. Coordinator 440 also increments its own operations tracker, as shown in the "Coord 440" portion of the "Operations Trackers" column of the table. In event 7.9, node 110C clears private log 232C since the data have been written to shared storage volume 150, as shown in the "Log 232C" portion of the "Private Log Contents" column of the table.

Referring now to FIG. 7C, coordinator 440 continues to process the read request obtained in event 7.2.1 of FIG. 7A. In event 7.10, coordinator 440 checks whether block A is locked. Finding that block A is unlocked, as shown in the "Lock on Block A of Shared Storage" column of the table, coordinator 440 checks the operations history in event 7.11. The target of the read request, block A, is present in the operations history with operation tracker values of 5 and 7, as shown in the "Operations History Contents" column of the table. Note that it only necessary to find one occurrence of the block in the operations history to determine that an invalidating operation has occurred.

Upon finding the target of the read request in the operations history, coordinator 440 notifies the reader to re-read block A in event 7.12. In event 7.13, the reader re-reads the data in block A from shared storage 150, where the data have a value of 200, as shown in the "Reader (Node 110A) Memory Contents" column of the table. In one embodiment, the reader sends a request to read simultaneously, whereas in other embodiments, the reader can re-read without sending a request, having just received a notification from the coordinator to re-read the regions or blocks of interest.

In event 7.14, a process running on node 110A (such as data manager 110A of FIG. 2) indicates that the read operation is completed. In event 7.15, a housekeeping function performed by coordinator 440 removes the write having an operations tracker of 5 from the operations history, as shown in the "Operations History Contents" column of the table, which now only includes the writes having operations tracker values of 6 and 7. Note that, if coordinator 440 were to now check the operations history, a potentially invalidating write to block A would be found, having a operations tracker value of 7.

Maintenance of a operations history as described with reference to FIG. 7 can impose minimal or great overhead, depending upon the implementation environment. Minimally, the overhead is incurred in the form of latency resulting from exchanging messages and missing one disk revolution. This minimal overhead is incurred when a corrective read operation is issued in parallel with the incorrect read operation and takes advantage of recently cached data and the location of the disk head in performing seek operations. In a worst-case scenario, maximum overhead is imposed in the form of latency imposed by the incorrect optimistic read operation. The amount of data retained in the operations history can be tuned depending upon the number of corrective read operations and can be dynamically adjusted to latencies experienced in the current distributed environment. In some cases, few read operations incur additional latency because invalidating read and write operations are prevented by the issuing application.

A disadvantage of using a counter for an operations tracker, as opposed to another implementation such as a timestamp, appears in symmetric multiprocessing (SMP) environments. In SMP environments, programs are executed by multiple processors that share a common operating system, memory, and I/O bus or data path. A counter is shared memory must be locked before the counter can be read or modified. In addition, every change to the counter requires a relatively expensive cache invalidation operation for each of the multiple processors. As the number of processors and the number of ways data are shared between caches for the processors grows, locking becomes even more expensive. In contrast, a timestamp can be read from a read-only hardware clock register that does not need to be locked. Maintenance and reading of frequently-changed counters in an SMP environment is therefore more expensive than using a timestamp provided by a clock register.

FIGS. 8A and 8B, collectively referred to as FIG. 8, show a table with examples of events that occur when using an operations history and operations trackers to detect that a node has received incorrect data. The initial state is shown in event 8.1 as including operations trackers for coordinator 440, node 110B, and 110C having a value of 7. Node 110A is shown as having a operations tracker of 2, indicating that the node has not been receiving notifications of updates to the operations tracker. The contents of the operations history include a write operation with an operations tracker value of 6 on block B, and a write operation with an operations tracker value of 7 on block A. Shared storage 150 is shown as having a value in block A of 200, and the lock for block A is unlocked. No data exist in reader memory contents or in private logs 232A, 232B, and 232C.

In event 8.2.1, node 110A requests to read data in block A. Simultaneously, in event 8.2.2, node 110A reads data in block A, having a value of 200, from shared storage 150, as shown in the "Reader (Node 110A) Memory Contents" column of the table Coordinator 440 checks the operations tracker value in event 8.3. The target of the read request, block A, is present in the operations history with an operations tracker value of 7, as shown in the "Operations History Contents" column of the table. Upon finding the target of the read request in the operations history, coordinator 440 notifies the reader to re-read block A and provides the correct value of the operations tracker to node 110A in event 8.4.

Referring to FIG. 8B, in event 8.5.1, node 110A sends a request to read data in block A to coordinator 440 providing the correct value of 7 for the operations tracker. In event 8.5.2, node 110A simultaneously re-reads the data in block A from shared storage volume 150, where the data have a value of 200, as shown in the "Readere (Node 110A) Memory Contents" column of the table. In event 8.6, a process running on node 110A (such as data manager 130A of FIG. 2) indicates that the read operation is completed, and in event 8.7, coordinator 440 sends a message to 110A to retain the data read from the shared storage because no invalidating operation has occurred and the operations trackers are synchronized.

Additional enhancements to the operations history can be made to help with a determination that a requesting reader's operations tracker value is unsynchronized. For example, additional information can be included in the operations history, such as a value of the coordinator's operations tracker for the entire storage at the time each write operation is completed. For example, assume that write operation #5 begins updating block A. By the time that write operation #5 is completed, several other write operations have occurred to other blocks of the storage, such that the current value of the operations tracker for the overall storage is 9. If a requesting reader's request to read block A includes a operations tracker having a value of 9 or higher, then the requesting reader is synchronized and the read operation on block A of the shared storage yields accurate results.

The advantages of performing optimistic read operations include improved efficiency because read operations can be performed without receiving permission from a coordinator that may reside elsewhere in the distributed system. The coordinator described herein avoids the timing problem described with reference to FIG. 3, detects when a read operation has read from a location in which data are invalid and/or out-of-date, and determines when a requesting reader node is not synchronized with the coordinator for the distributed system. When the requesting reader is not synchronized or the data read are invalid and/or out-of-date, the coordinator directs the requesting reader to read the data again.

The functionality for performing optimistic read operations can be implemented in a multi-node environment using a variety of computer systems and networks. An example of one such computing environment is described below with reference to FIG. 9.

An Example Computing and Network Environment

Figure 9:
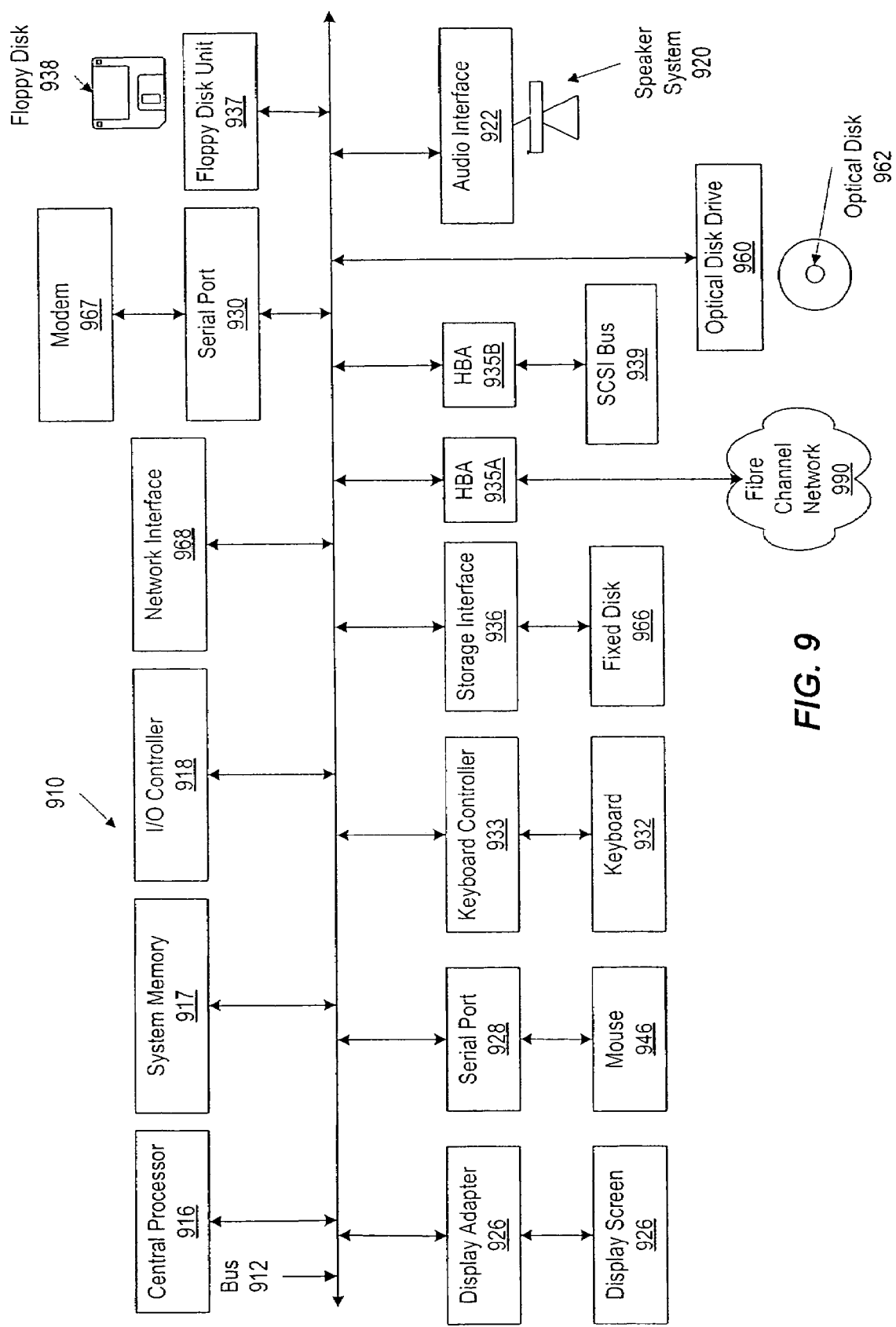
FIG. 9 shows an example of a computer system that can be used to operate the present invention.

FIG. 9 depicts a block diagram of a computer system 910 suitable for implementing the present invention. Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a fibre channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded and typically affords at least 66 megabytes of memory space. The ROM or flash memory may contain, among other code, the Basic Input-Output system (BIOS) which controls basic hardware operation such as the interaction with peripheral components. Applications resident with computer system 910 are generally stored on and accessed via a computer readable medium, such as a hard disk drive (e.g., fixed disk 944), an optical drive (e.g., optical drive 940), floppy disk unit 937 or other storage medium. Additionally, applications may be in the form of electronic signals modulated in accordance with the application and data communication technology when accessed via network modem 947 or interface 948.

Storage interface 934, as with the other storage interfaces of computer system 910, may connect to a standard computer readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 9 to be present to practice the present invention. The devices and subsystems may be interconnected in different ways from that shown in FIG. 9. The operation of a computer system such as that shown in FIG. 9 is readily known in the art and is not discussed in detail in this application. Code to implement the present invention may be stored in computer-readable storage media such as one or more of system memory 917, fixed disk 944, optical disk 942, or floppy disk 938. Additionally, computer system 910 may be any kind of computing device, and so includes personal data assistants (PDAs), network appliance, X-window terminal or other such computing devices. The operating system provided on computer system 910 may be MS-DOS®, MS-WINDOWS®, OS/2®, UNIX®, Linux®, or another known operating system. Computer system 910 also supports a number of Internet access tools, including, for example, an HTTP-compliant web browser having a JavaScript interpreter, such as Netscape Navigator®, Microsoft Explorer®, and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 910). It is to be understood that such depicted architectures are merely examples, and that, in fact, many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

OTHER EMBODIMENTS

In one embodiment, network 102 of FIG. 1 is replaced by a clustered system in which nodes in a cluster share data stored in a common storage.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention. Consequently, the invention is intended to be limited only by the scope of the appended claims, giving full cognizance to equivalents in all respects.

What is claimed is:

1. A method comprising:
receiving a request to perform a first read operation to read data from a first location, wherein the request comprises a first tracker value;
transmitting a notification to perform a second read operation to read the data from the first location, if the first tracker value is less than a second tracker value, wherein the second tracker value is associated with the first location; and
transmitting a notification of permission to perform the first read operation to read the data from the first location, if the first and second tracker values are equal.

2. The method of claim 1 further comprising:
transmitting a notification to read the data from a second location, if a lock is associated with the first location.

3. The method of claim 2, wherein the second location is a log comprising a version of the data.

4. The method of claim 3 further comprising:
performing said transmitting the notification to read the data from the second location, if reading from the log is permitted.

5. The method of claim 1 further comprising:
transmitting a notification to wait to read the data from the first location, if a lock is associated with the first location;
determining when the lock associated with the first location is unlocked; and
transmitting a notification to read the data from the first location, in response to said determining when the lock associated with the first location is unlocked.

6. The method of claim 5 further comprising:
performing said transmitting the notification to wait, if reading from a log comprising a version of the data is not permitted.

7. The method of claim 1, wherein
the request to perform the first read operation to read data from the first location originates from a first node, and
the first tracker value is associated with a time of an immediately previous instance in which the first node communicated with a node performing said receiving the request to perform the first read operation to read data.

8. The method of claim 1, wherein
the second tracker value is associated with a time of an invalidating operation associated with data stored at the first location.

9. The method of claim 8, wherein an invalidating operation comprises at least one of
a write operation to the data stored at the first location,
a configuration of storage in which the data are stored,
a configuration of a cluster managing the data, and
a partition of the cluster.

10. A system comprising:
a processor;
a memory, coupled to the processor, storing instructions executable by the processor, said instructions configured to cause the processor to
receive a request to perform a first read operation to read data from a first location, wherein the request comprises a first tracker value;

transmit a notification to perform a second read operation to read the data from the first location, if the first tracker value is less than a second tracker value, wherein the second tracker value is associated with the first location; and transmit a notification of permission to perform the first read operation to read the data from the first location, if the first and second tracker values are equal.

11. The system of claim 10 wherein the memory stores additional instructions executable by the processor, said instructions configured to cause the processor to transmit a notification to read the data from a second location, if a lock is associated with the first location.

12. The system of claim 10 wherein the memory stores additional instructions executable by the processor, said instructions configured to cause the processor to:

transmit a notification to wait to read the data from the first location, if a lock is associated with the first location;

determine when the lock associated with the first location is unlocked; and transmit a notification to read the data from the first location, in response to said determining when the lock associated with the first location is unlocked.

13. An apparatus comprising:

means for receiving a request to perform a first read operation to read data from a first location, wherein the request comprises a first tracker value;

means for transmitting a notification to perform a second read operation to read the data from the first location, if the first tracker value is less than a second tracker value, wherein the second tracker value is associated with the first location; and means for transmitting a notification of permission to perform the first read operation to read the data from the first location, if the first and second tracker values are equal.

14. The apparatus of claim 13 further comprising:

means for transmitting a notification to read the data from a second location, if a lock is associated with the first location.

15. The apparatus of claim 13 further comprising:

means for transmitting a notification to wait to read the data from the first location, if a lock is associated with the first location;

means for determining when the lock associated with the first location is unlocked; and means for transmitting a notification to read the data from the first location, in response to said means for determining when the lock associated with the first location is unlocked.

16. A computer-readable storage medium comprising:

a first set of instructions, executable by a processor, configured to receive a request to perform a first read operation to read data from a first location, wherein the request comprises a first tracker value;

a second set of instructions, executable by the processor, configured to transmit a notification to perform a second read operation to read the data from the first location, if the first tracker value is less than a second tracker value, wherein the second tracker value is associated with the first location; and a third set of instructions, executable by the processor, configured to transmit a notification of permission to perform the first read operation to read the data from the first location, if the first and second tracker values are equal.

17. The computer-readable storage medium of claim 16 further comprising:

a forth set of instructions, executable by the processor, configured to transmit a notification to read the data from a second location, if a lock is associated with the first location.

18. The computer-readable storage medium of claim 16 further comprising:

a fourth set of instructions, executable by the processor, configured to transmit a notification to wait to read the data from the first location, if a lock is associated with the first location;

a fifth set of instructions, executable by the processor, configured to determine when the lock associated with the first location is unlocked; and a sixth set of instructions, executable by the processor, configured to transmit a notification to read the data from the first location, in response to said determining when the lock associated with the first location is unlocked.

* * * * *